(12) United States Patent
Paek (10) Patent No.: US 6,202,809 B1
(45) Date of Patent: Mar. 20, 2001

(54) POWER SUPPLY MECHANISM IN CONVEYOR SYSTEM

(75) Inventor: Jae-kyong Paek, Suwon (KR)

(73) Assignee: Samsung Electronics Co. Ltd., Suwon (KR)

( * ) Notice: Subject to any disclaimer, the term of this patent is extended or adjusted under 35 U.S.C. 154(b) by 0 days.

(21) Appl. No.: 09/118,850

(22) Filed: Jul. 20, 1998

(30) Foreign Application Priority Data

Jul. 18, 1997 (KR) .................................................. 97-33538

(51) Int. Cl.⁷ ....................................................... B60L 5/00
(52) U.S. Cl. ...................................... 191/45 A; 191/22 R
(58) Field of Search ............................... 191/2, 6, 14, 15, 191/22 R, 23 R, 33 R, 45 R, 45 A (56) References Cited

U.S. PATENT DOCUMENTS

| | | |
|---|---|---|
| 4,692,694 | 9/1987 | Yokoi et al. . |
| 5,449,056 * | 9/1995 | Ross ......................................... 191/6 |
| 5,503,259 | 4/1996 | Clopton et al. . |

* cited by examiner

Primary Examiner—S. Joseph Morano
Assistant Examiner—Robert J. McCarry, Jr.
(74) Attorney, Agent, or Firm—Robert E. Bushnell, Esq.

(57) ABSTRACT

There is provided a power supply mechanism of a conveyor system in which power can be provided to a product placed on a pallet by conductive brushes in which said pallet is slidingly transferred to contact the conductive brushes. The power supply mechanism includes a switch for connecting or disconnecting first and second groups of conductive brushes of the conveyor system to or from each other, a driving power source electrically connected to the switch, for providing power for operating the switch, a limit switch for continuing or discontinuing power supplied from the driving power source to the switch, a first connection line for connecting the first conductive brush group to the switch, and a second connection line for connecting the second conductive brush group to the switch. According to the above power supply mechanism, the limit switch is operated only after the copper contact terminal plate on the bottom surface of the pallet completely contacts the second conductive brush group. Also, after the limit switch is operated, power is applied to the switch. The first and second conductive brush groups are connected to each other by the operation of the switch, so that alternating current (AC) power is supplied to the brushes in the second group and the pallet in contact with the brushes. Therefore, problems such as sparks being generated by the pallet contacting brushes that are already conducting electricity, is prevented for the most part.

31 Claims, 7 Drawing Sheets

POWER SUPPLY MECHANISM IN CONVEYOR SYSTEM

CLAIM OF PRIORITY

This application makes reference to, incorporates the same herein, and claims all benefits accruing under 35 U.S.C. § 119 from an application entitled Power Supply Mechanism in Convertor System earlier filed in the Korean Industrial Property Office on the 18 day of July 1997, and there duly assigned Serial No. 33538/1997, a copy of which is annexed hereto.

BACKGROUND OF THE INVENTION

1. Technical Field

The present invention relates to a power supply mechanism in a conveyor system, and more particularly, to a power supply mechanism in a conveyor system which provides power to a product placed on a pallet.

2. Related Art

In general, a conveyor system is installed in a manufacturing line or assembly line as part of an automated system. In manufacturing products using the conveyor system, a predetermined process, for example an aging or breaking in process, is conducted after assembly of products. The aging or breaking in process is performed when a partly-assembled product is placed on a pallet, power is applied to the pallet via a conductive brush or roller installed in the conveyor system, and power is applied to the product by connecting a power cord of the product to a power plug socket provided on the pallet.

The pallet being a type of moving work area is transferred onto conductive brushes by the operation of the conveyor system, and a copper contact terminal plate provided on the bottom surface of the pallet contacts the brushes. Thus, a voltage supplied to the brushes is also supplied to the pallet. Then a necessary voltage is applied to the product placed and transferred on the pallet, via the power plug socket installed on the pallet, whereby a process such as an aging or breaking-in process can be performed.

However, in the conventional power supply mechanism, at the moment the brushes already conducting electricity contact the copper contact terminal plate installed on the bottom surface of the pallet, sparks are generated. Therefore, power surges occur, so that there are sudden variations in voltage. As a result, there are severe voltage variations in the direct current (DC) power actually provided to circuits inside the product, so that the circuits malfunction or become damaged. Also, carbide deposits form on the brushes or the copper contact terminal plate on the bottom surface of the pallet because of the sparks. Sometimes, the brush or the copper contact terminal plate becomes so severely damaged that power cannot be smoothly supplied. Consequently, there are various difficulties in conducting and performing tests and processes. Furthermore, frequent scratching on the brush or copper contact terminal plate causes problems, and replacement of the damaged brush or copper contact terminal plate reduces durability. Also, delays are caused in the process, thus lowering the productivity in the manufacturing process.

Power systems for electronic components are disclosed in U.S. Pat. No. 4,692,694 for Load Testing Apparatus for Electronic Components issued to Yokoi et al., U.S. Pat. No. 5,449,056 for Electric Power Distribution System issued to Ross, and U.S. Pat. No. 5,503,259 for Electrification Module for Conveyor issued to Clopton et al.

Although various power systems for electronic components currently exist, I have discovered that there is a need to provide an improved power supply mechanism in a conveyor system.

SUMMARY OF THE INVENTION

It is an object of the present invention to provide a power supply mechanism in a conveyor system, which can prevent sparks from being generated when a power supply brush contacts a contact terminal on the bottom surface of a pallet.

To accomplish the above object and others, there is provided a power supply mechanism of a conveyor system in which power can be provided to a product placed on a pallet by conductive brushes in which said pallet is slidingly transferred to contact the conductive brushes, comprising: a switch for connecting or disconnecting first and second groups of conductive brushes of the conveyor system to or from each other; a driving power source electrically connected to the switch, for providing power for operating the switch; a limit switch for continuing or discontinuing power supplied from the driving power source to the switch; a first connection line for connecting the first conductive brush group to the switch; and a second connection line for connecting the second conductive brush group to the switch.

According to the present invention, the limit switch is operated when the second group of conductive brushes completely contact the copper contact terminal plate on the bottom surface of the pallet. Also, after the limit switch is operated, power is applied to the switch, and the first and second groups of conductive brushes are connected to each other by the operation of the switch, so that alternating current (AC) power can be supplied to the pallet contacting the second group of brushes. Therefore, the generation of sparks caused by contacting the pallet with brushes that are already conducting electricity can be fundamentally prevented.

To accomplish the above object and others, there is provided a power supply apparatus supplying power to a pallet, comprising: a conveyor unit conveying a pallet, the pallet supporting a device; a first plurality of electrically conductive terminals coupled to said conveyor unit, said first plurality of terminals receiving primary power from a primary power source; a second plurality of electrically conductive terminals coupled to said conveyor unit; a first switch coupled to said first and second pluralities of terminals, said first switch electrically connecting said first plurality of terminals with said second plurality of terminals, and said first switch electrically disconnecting said first plurality of terminals from said second plurality of terminals; a secondary power source electrically coupled to said first switch and supplying secondary power to said first switch for operation of said first switch; a second switch disposed between said first switch and said secondary power source, said second switch connecting said secondary power source with said first switch, and said second switch disconnecting said secondary power source from said first switch; a first cable connecting said first plurality of terminals to said first switch and conveying primary power of said primary power source from said first plurality of terminals to said first switch; and a second cable connecting said second plurality of terminals to said first switch and conveying primary power of said primary power source from said first switch to said second plurality of terminals, the primary power of said primary power source being transferred from said second plurality of terminals to said pallet.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
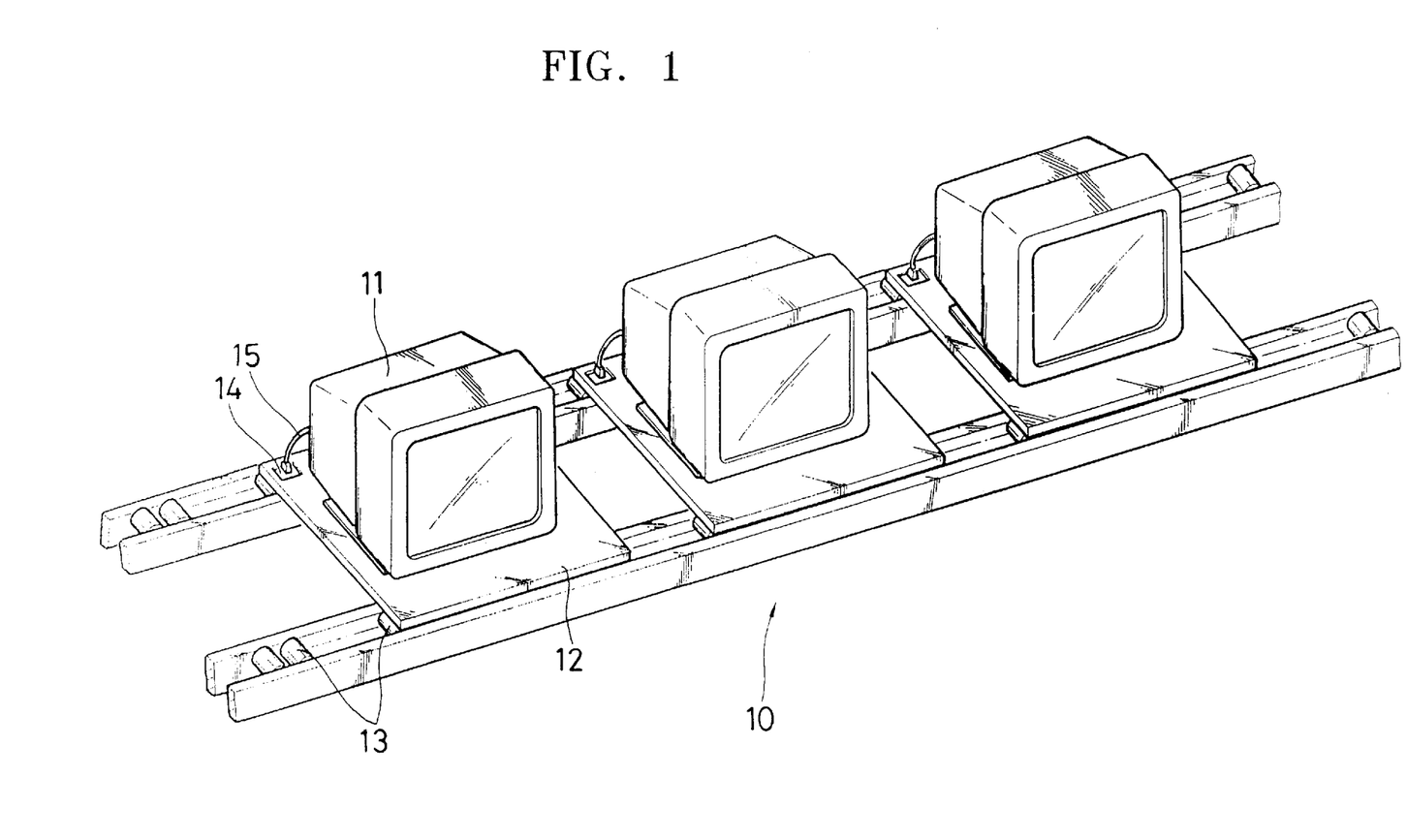
FIG. 1 illustrates a conventional conveyor system.

Turn now to FIG. 1, which illustrates a conventional conveyor system. In general, a conveyor system 10 is installed in a manufacture/assembly line as part of an automated system, as shown in FIG. 1. In manufacturing products using the conveyor system 10, a predetermined process, for example, an aging (breaking in) process is conducted after assembly of products. The aging (breaking in) process is performed when a half-assembled product 11 is placed on a pallet 12, power is applied to the pallet 12 via a conductive brush (roller) 13 installed in the conveyor system 10, and power is applied to the product 11 by connecting a power cord 15 of the product 11 to a power plug socket 14 provided on the pallet 12.

Figure 2:
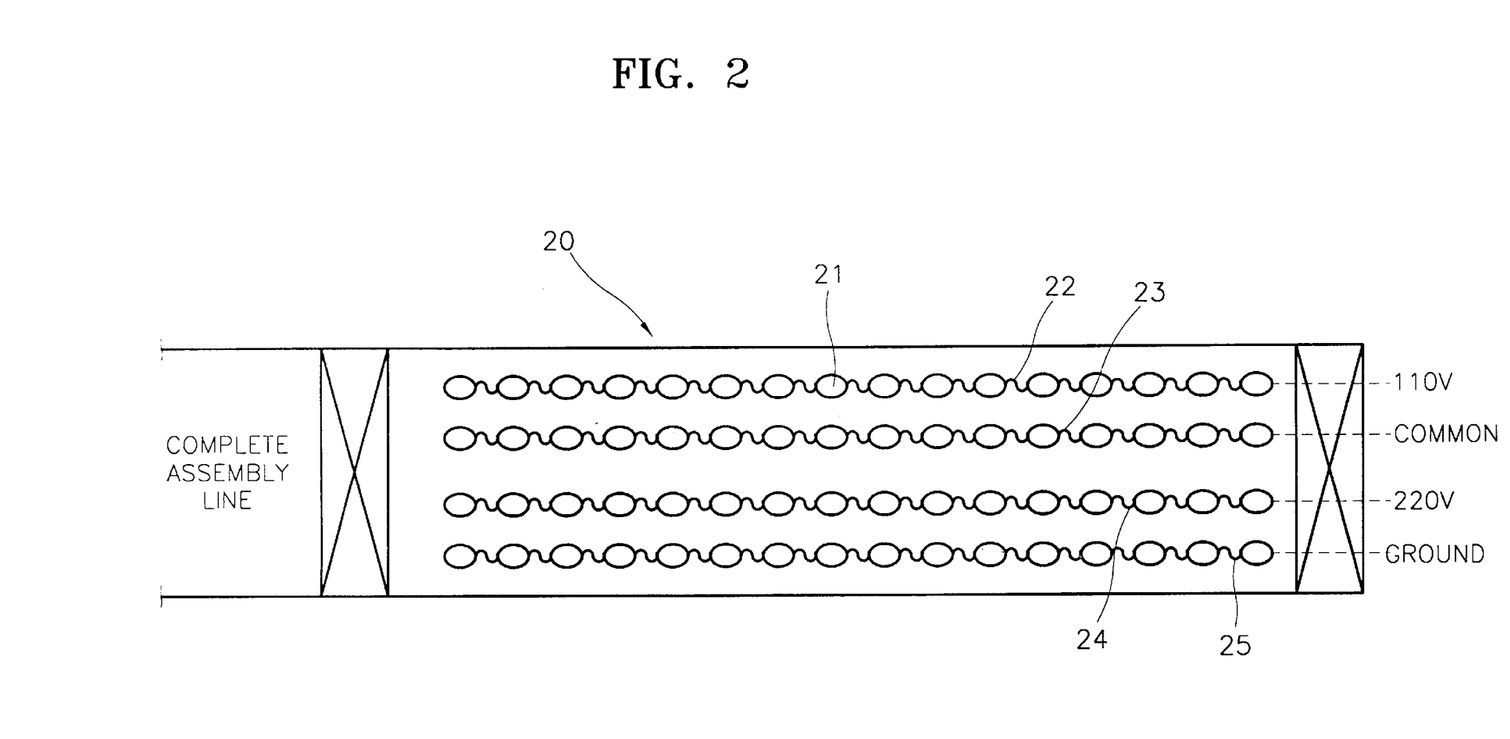
FIG. 2 illustrates a diagram showing conductive brushes and a power supply route in an aging or breaking-in line of a conventional conveyor system.

Refer now to FIG. 2, which illustrates a diagram showing conductive brushes and a power supply route in an aging or breaking-in line of a conventional conveyor system. FIG. 2 is a circuit configuration view for schematically showing a power supply route in a conventional conveyor system provided with the above conductive brush.

Referring to FIG. 2, an aging (breaking-in) line 20 is provided in the conventional conveyor system with a multitude of power supply brushes 21 arranged parallel in a lengthwise direction in the conveyor system 10. Rows 22, 23, 24 and 25 of the brushes 21 are connected to a 110 volt (110V) power supply line, a common line (COMMON), a 220 volt (220V) power supply line and a ground line (GROUND), respectively. In the aging (breaking-in) line 20 of the conventional conveyor system 10 having such a configuration, a 110 volt or 220 volt power is supplied to the brush rows 22 and 23 or 23 and 24 through the 110 volt or 220 volt power supply lines. The pallet 12 of FIG. 1 being a type of moving workstand is transferred onto the brush rows 22 and 23 or 23 and 24 by the operation of the conveyor system, and a copper contact terminal plate (not shown) provided on the bottom surface of the pallet 12 contacts the brushes 21 in the brush rows 22 and 23 or 23 and 24. If then, the 110 volt or 220 volt power supplied to the brush rows is also supplied to the pallet 12. Then, a necessary voltage is applied to the product 11 placed and transferred on the pallet 12, via the power plug socket 14 installed on the pallet 12, whereby a process such as an aging (breaking-in) process can be performed.

Figure 3:
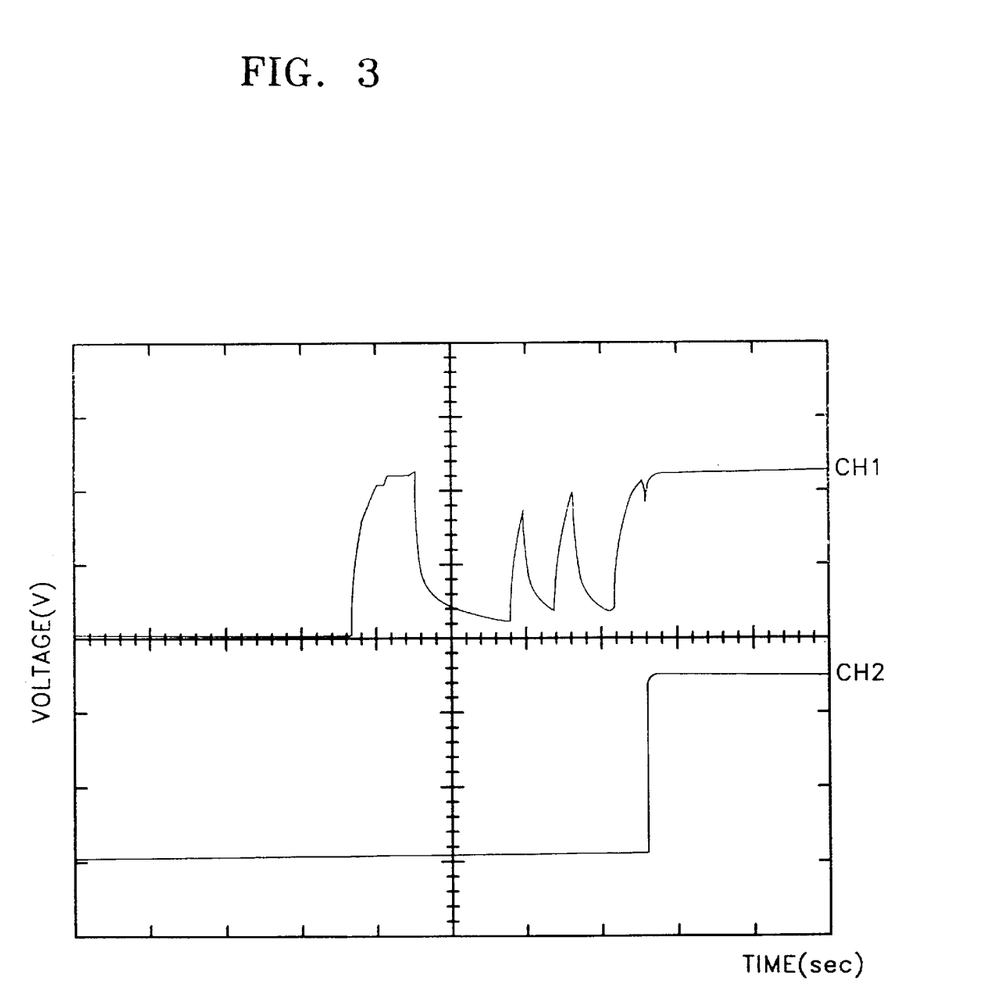
FIG. 3 illustrates a voltage-time graph showing surges generated when a conductive brush contacts a contact terminal to receive power by means of conductive brushes and a power supply mechanism, in a conventional conveyor system.

Turn now to FIG. 3, which illustrates a voltage-time graph showing surges generated when a conductive brush contacts a contact terminal to receive power by means of conductive brushes and a power supply mechanism, in a conventional conveyor system. In the conventional power supply mechanism, at the moment the brush 21 already conducting electricity contacts the copper contact terminal plate installed on the bottom surface of the pallet, sparks are generated. Therefore, power surges occur, so that there are sudden variations in voltage, as shown in FIG. 3. As a result, there are severe voltage variations in the direct current (DC) power actually provided to circuits inside the product 11, so that the circuits malfunction or become damaged. Also, carbide deposits form on the brushes 21 or the copper contact terminal plate on the bottom surface of the pallet because of the sparks. Sometimes, the brush or the copper contact terminal plate becomes so severely damaged that power cannot be smoothly supplied. Consequently, there are various difficulties in conducting and performing test and processes. Furthermore, frequent scratching on the brush or copper contact terminal plate having problems, and replacement of the damaged brush or copper contact terminal plate, reduces the durability thereof. Also, delays are caused in the process, thus lowering the productivity in the manufacturing process.

Figure 4:
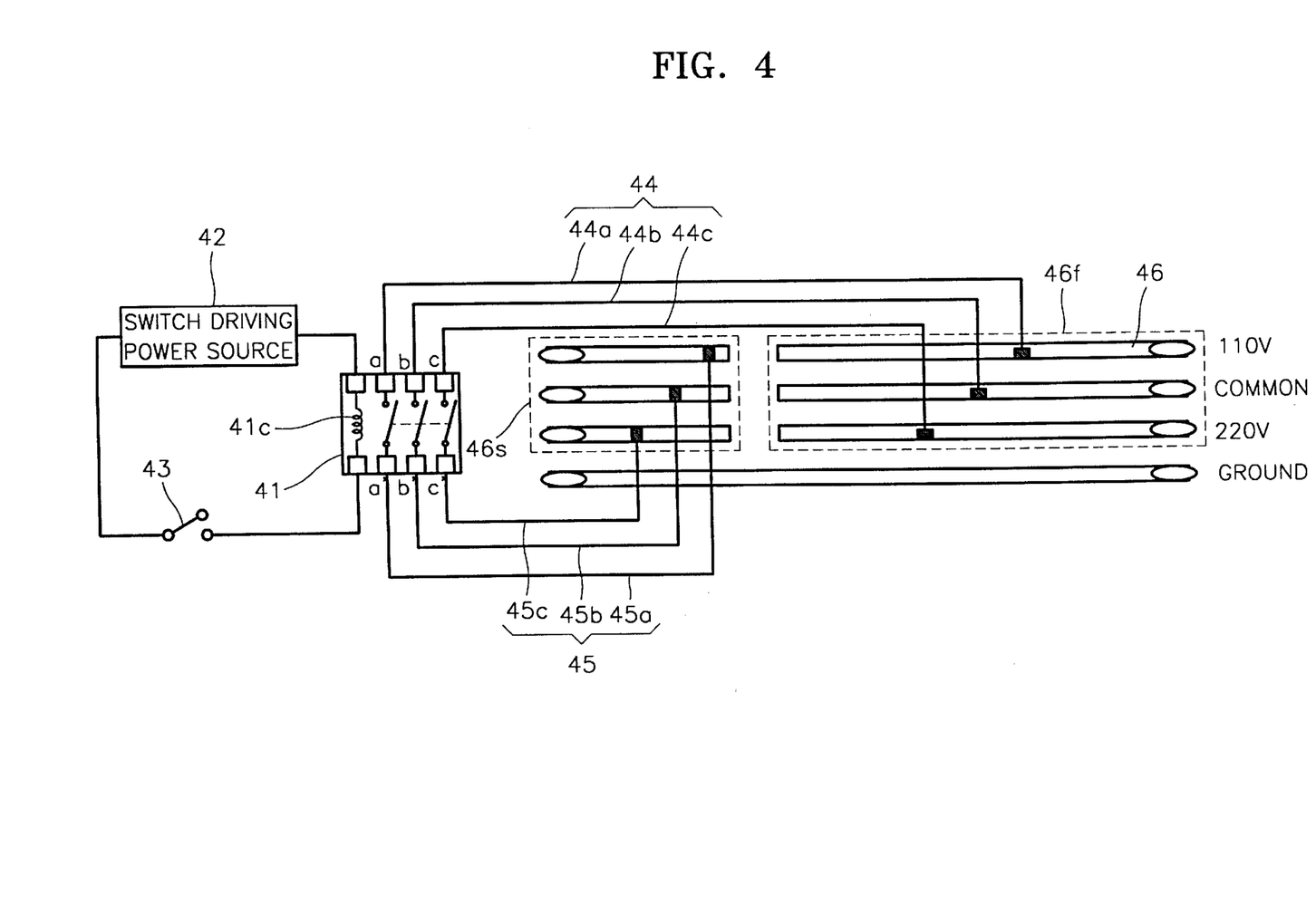
FIG. 4 illustrates a diagram of a power supply mechanism in a conveyor system, in accordance with the principles of the present invention.
Figure 5:
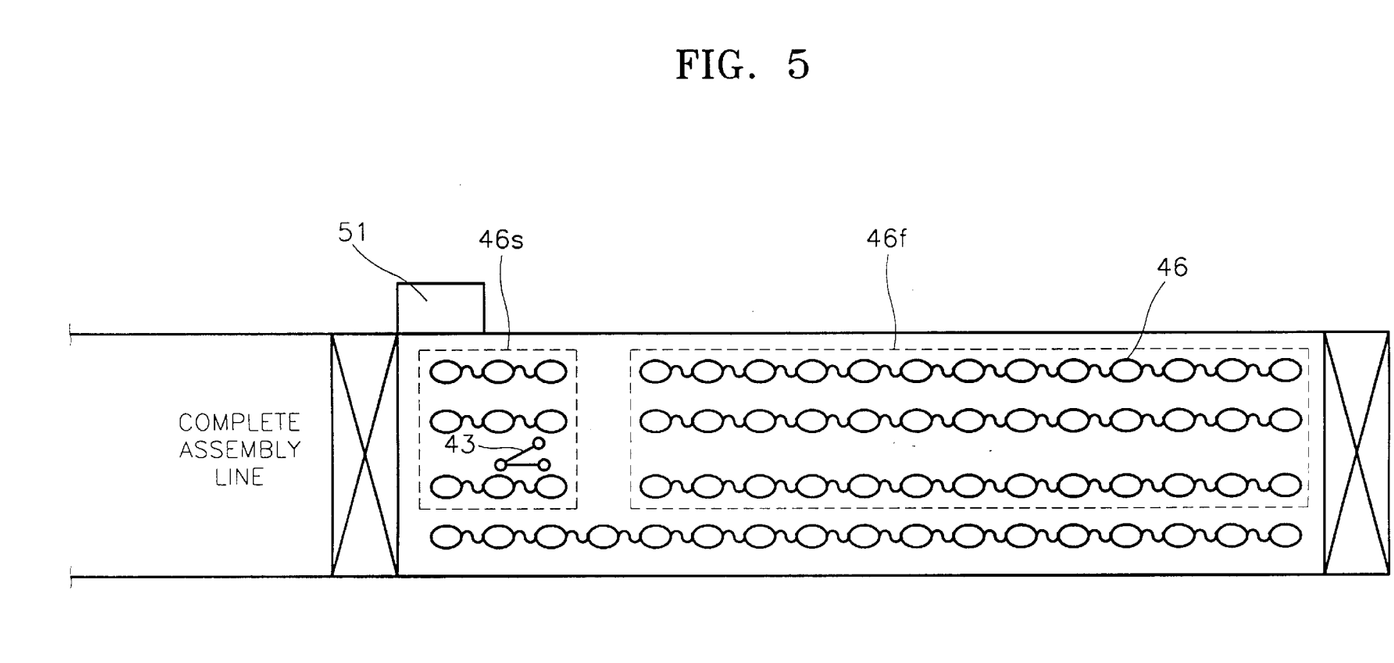
FIG. 5 illustrates a power supply mechanism in accordance with the principles of the present invention, united and adopted in a conveyor system.

Refer now to FIG. 4, which illustrates a diagram of a power supply mechanism in a conveyor system, in accordance with the principles of the present invention. Also refer to FIG. 5, which illustrates a power supply mechanism in accordance with the principles of the present invention, united and adopted in a conveyor system. Referring to FIGS. 4 and 5, a power supply mechanism for a conveyor system according to the present invention is adopted to a conveyor system in which power can be supplied to a product on a pallet by conductive brushes in which the pallet slidingly contacts and is transferred on the conductive brushes. The power supply mechanism is comprised of a switch 41 for connecting or disconnecting first and second groups 46f and 46s of conductive brushes 46 of a conveyor system to or from each other, a switch driving power source 42 electrically connected to the switch 41 for providing power for operating the switch 41, a limit switch 43 for continuing or discontinuing power supplied from the switch driving power source 42 to the switch 41, a first connecting line 44 for connecting the first group 46f of the conductive brushes 46 to the switch 41, and a second connecting line 45 for connecting the second group 46s of the conductive brushes 46 to the switch 41. In order to adopt the power supply mechanism according to the present invention described above, the conductive brushes 46 of the conveyor system must be divided into the first group 46f which always conducts electricity, and the second group 46s which conducts depending on the operation of the switch 41.

Meanwhile, an electromagnetic switch is used as the switch 41. The switch 41 is switched on (activated) by the electromagnetic operation of an internal coil 41c when a current is applied and connects circuits to each other, and is switched off (deactivated) by the release of the electromagnetic operation of the coil 41c when power is cut-off and disconnects the circuits. The limit switch 43 is switched on when the pallet 12 of FIG. 1 correctly contacts the second group 46s of the conductive brushes 46. That is, when the pallet 12 is transferred on the second group 46s of the conductive brushes 46 and a copper contact terminal plate provided on the bottom surface of the pallet 12 correctly contacts the second brush group 46s, the limit switch 43 can be switched on by being pressed by the weight of the pallet 12.

Also, the first connection line 44 has three wires 44a, 44b and 44c. One end of each of the wires is connected to each of 110 volt and 220 volt alternating current (AC) supply lines and a common line (COMMON), and the other end thereof is connected to connection ports a, b and c of the switch 41, respectively. Similarly, the second connection line 45 has three wires 45a, 45b and 45c. One end of each of the wires is connected to 110 volt and 220 volt alternating current (AC) supply lines and the common line (COMMON) of the second brush group 46s corresponding to the first brush group 46f, respectively, and the other ends thereof are connected to the connection ports a', b' and c' of the switch 41, respectively.

In the power supply mechanism for a conveyor system according to the present invention having such a configuration, its essential components, that is, the switch 41 and the switch driving power source 42 are included in a predetermined-size box 51, and the box 51 is installed on one side of a frame of a conveyor system. In particular, the limit switch 43 is installed in a predetermined portion of the second brush group 46s. That is, the limit switch 43 is installed such that it can be switched on by being pressed by the pallet 12 when the pallet 12 is transferred onto the second brush group 46s and thus the copper contact terminal plate provided on the bottom surface of the pallet 12 correctly contacts the second brush group 46s, as described above. At this time, there is no doubt that the limit switch 43 and the box 51 is electrically connected to each other. The first and second brush groups 46f and 46s are also connected to the box 51 via wires as described above.

Figure 6:
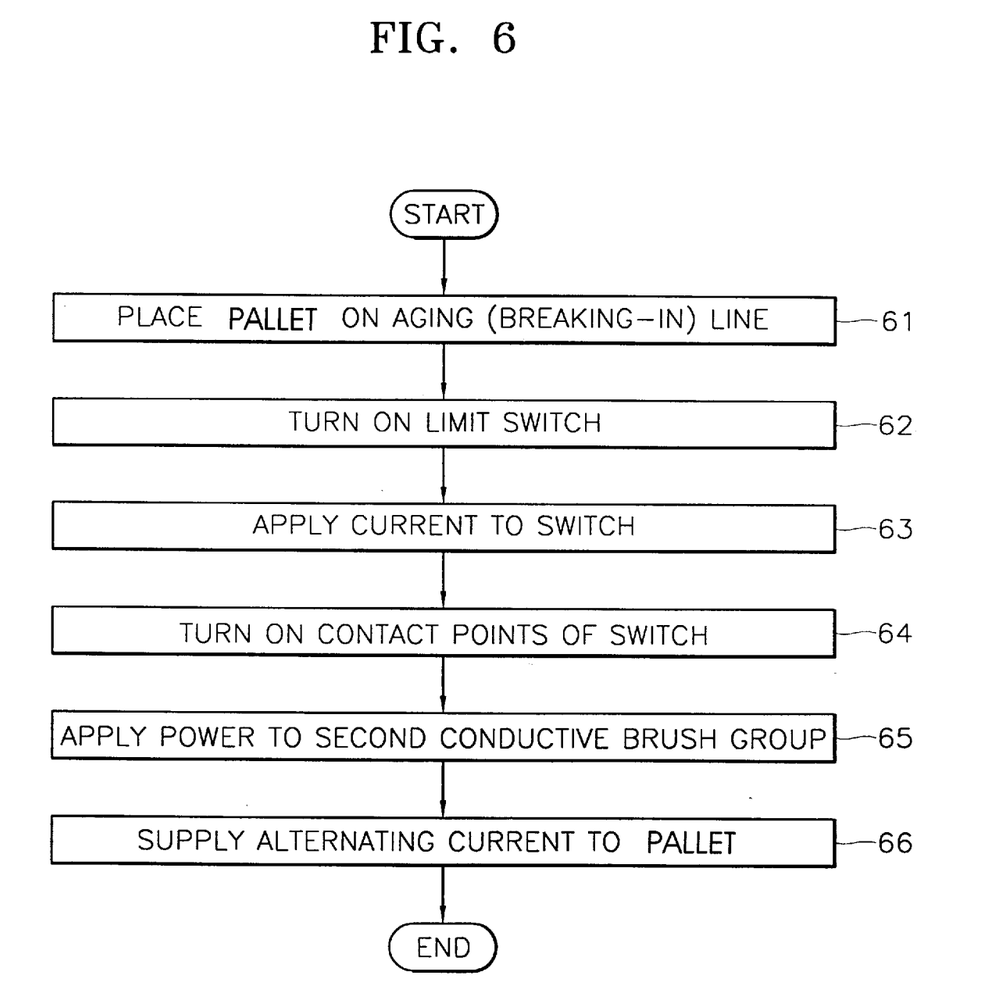
FIG. 6 illustrates a flowchart outlining a process in which power is supplied to a pallet by a power supply mechanism in a conveyor system, in accordance with the principles of the present invention.

Turn now to FIG. 6, which illustrates a flowchart outlining a process in which power is supplied to a pallet by a power supply mechanism in a conveyor system, in accordance with the principles of the present invention. The mechanism in which power is supplied from the brushes to the pallet transferred by the conveyor system adopting the power supply mechanism for a conveyor system according to the present invention having such a configuration, will be described with reference to FIGS. 4 through 6.

In FIG. 6 at step 61, the pallet 12 is placed on the second conductive brush group 46s in the aging (breaking-in) line 20 of FIG. 2 by the operation of the conveyor system. At step 62, a contact lever (not shown) of the limit switch 43 is pressed by the weight of the pallet 12, so that the limit switch 43 is switched on. At step 63, the switch driving power source 42 applies current to the switch 41. Thus, current flows in the coil 41c inside the switch to thus form an electromagnet. At step 64, the respective contact points (a–a'), (b–b') and (c–c') of the switch 41 are switched on by the mechanical operation of the magnetic force of the electromagnet. At step 65, the first and second conductive brush groups 46f and 46s are connected to each other, whereby an alternating current (AC) voltage of 110 volts or 220 volts is supplied to the second brush group 46s. At step 66, the power is simultaneously supplied to the pallet 12 contacting the second brush group 46s via the copper contact terminal plate installed on the bottom surface of the pallet. Thus, a user connects the power cord 15 of a transferred product on the pallet 12 to the power plug socket 14 of FIG. 1 connected to the power supply, so that a predetermined test or an aging (breaking-in) process can be performed.

Figure 7:
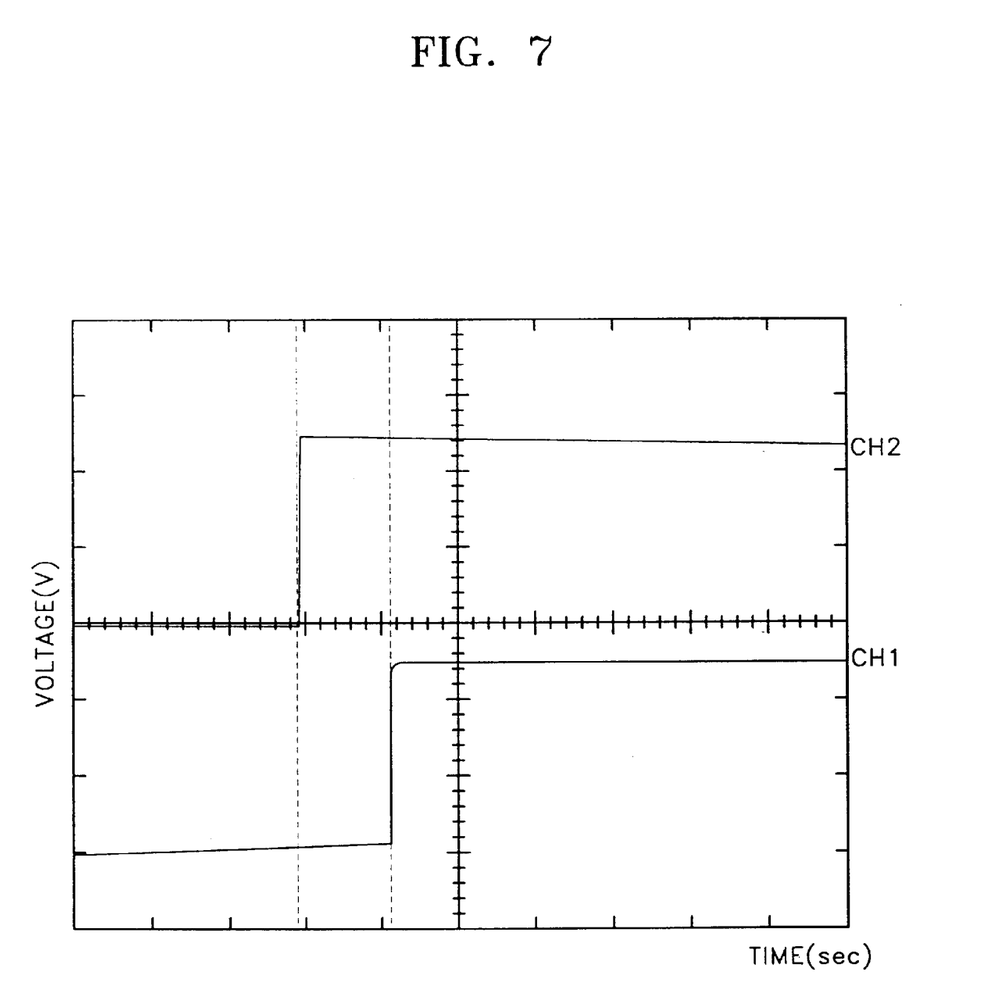
FIG. 7 illustrates a graph showing the characteristics of a voltage supplied to the pallet by the power supply mechanism in a conveyor system, in accordance with the principles of the present invention.

According to a series of processes, the supply of power from the second brush group 46s to the pallet 12 is accomplished after the copper contact terminal plate on the bottom surface of the pallet 12 completely contacts the second brush group 46s. Turn now to FIG. 7, which illustrates a graph showing the characteristics of a voltage supplied to the pallet by the power supply mechanism in a conveyor system, in accordance with the principles of the present invention. Power is stably provided without surges due to the generation of sparks, as shown in FIG. 7.

As described above, in the power supply mechanism of a conveyor system according to the present invention, the limit switch is operated only after the copper contact terminal plate on the bottom surface of the pallet completely contacts the second conductive brush group. Also, after the limit switch is operated, power is applied to the switch. The first and second conductive brush groups are connected to each other by the operation of the switch, so that alternating current (AC) power is supplied to the brushes in the second group and the pallet in contact with the brushes. Therefore, problems such as sparks generated in a conventional mechanism by the pallet contacting brushes that are conducting electricity are prevented for the most part, so that power can be stably provided. Consequently, malfunctions in or damage to circuits can be prevented, and process delays due to scratching on the brushes or pallet or replacement of damaged brushes or the pallet can be prevented. Thus, productivity in the manufacture of products can be enhanced.

The foregoing paragraphs describe the details of a power supply mechanism in a conveyor system, and more particularly, of a power supply mechanism in a conveyor system which provides power to a product placed on a pallet by means of a conductive brush in which the pallet is slidingly transferred and contacts the conductive brush and a power supply mechanism in a conveyor system which can prevent sparks and surges generated by the contact of the brush with the pallet.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A power supply apparatus supplying power to a pallet, comprising:

a conveyor unit conveying a pallet, the pallet supporting a device, the pallet having an electrically conductive surface;

a first plurality of electrically conductive terminals of said conveyor unit, said first plurality of terminals receiving primary power from a primary power source;

a second plurality of electrically conductive terminals of said conveyor unit, said second plurality of terminals being separately located from said first plurality of terminals;

a first switch coupled to said first and second pluralities of terminals, said first switch electrically connecting said first plurality of terminals with said second plurality of terminals to supply power to said second plurality of terminals, and said first switch electrically disconnecting said first plurality of terminals from said second plurality of terminals to not supply power to said second plurality of terminals;

the pallet being positioned onto said second plurality of terminals when said second plurality of terminals is not receiving power;

said first switch connecting said first plurality of terminals with said second plurality of terminals after said conductive surface of the pallet contacts said second plurality of terminals; and the pallet continuously receiving power when being conveyed from said second plurality of terminals to said first plurality of terminals.

2. The apparatus of claim 1, said second plurality of terminals being adjacent to said first plurality of terminals.

3. The apparatus of claim 1, further comprising:

a secondary power source electrically coupled to said first switch and supplying secondary power to said first switch for operation of said first switch;

a second switch disposed between said first switch and said secondary power source, said second switch connecting said secondary power source with said first switch, and said second switch disconnecting said secondary power source from said first switch;

a first cable connecting said first plurality of terminals to said first switch and conveying primary power of said primary power source from said first plurality of terminals to said first switch; and a second cable connecting said second plurality of terminals to said first switch and conveying primary power of said primary power source from said first switch to said second plurality of terminals, the primary power of said primary power source being transferred from said second plurality of terminals to said pallet.

4. The apparatus of claim 3, wherein said second switch corresponds to a limit switch.

5. The apparatus of claim 3, wherein said first plurality of terminals correspond to a first plurality of conductive brushes and said second plurality of terminals correspond to a second plurality of conductive brushes.

6. The apparatus of claim 5, wherein said first switch further comprises:

a first plurality of electrically conductive contacts coupled to said first cable;

a second plurality of electrically conductive contacts coupled to said second cable; and an electromagnet connecting said first plurality of contacts with said second plurality of contacts when said second switch connects said secondary power source with said first switch, and disconnecting said first plurality of contacts from said second plurality of contacts when said second switch disconnects said secondary power source from said first switch.

7. The apparatus of claim 5, wherein said first switch corresponds to an electromagnetic switch.

8. The apparatus of claim 5, wherein said first switch further comprises:

a first plurality of electrically conductive contacts coupled to said first cable;

a second plurality of electrically conductive contacts coupled to said second cable;

a coil; and said first plurality of contacts being connected to said second plurality of contacts by electromagnetic operation of said coil when said second switch connects said secondary power source with said first switch, and said first plurality of contacts being disconnected from said second plurality of contacts by electromagnetic operation of said coil when said second switch disconnects said secondary power source from said first switch.

9. The apparatus of claim 5, wherein said second switch connects said secondary power source with said first switch when said pallet conveyed by said conveyor unit contacts said second plurality of conductive brushes.

10. The apparatus of claim 5, wherein said electrically conductive surface of said pallet corresponds to a copper terminal plate coupled to a side of said pallet contacting said second plurality of conductive brushes.

11. The apparatus of claim 9, wherein said electrically conductive surface of said pallet corresponds to a copper terminal plate coupled to a bottom side of said pallet, the copper terminal plate contacting said second plurality of conductive brushes.

12. The apparatus of claim 6, wherein said electromagnet corresponds to a coil.

13. The apparatus of claim 6, said first cable further comprising:

a first wire having a first end coupled to a first brush from among said first plurality of brushes, the first brush from among said first plurality of brushes receiving a first primary power from said primary power source, and said first wire having a second end coupled to a first electrically conductive contact from among said first plurality of electrically conductive contacts of said first switch;

a second wire having a first end coupled to a second brush from among said first plurality of brushes, the second brush from among said first plurality of brushes receiving a second primary power from said primary power source, and said second wire having a second end coupled to a second electrically conductive contact from among said first plurality of electrically conductive contacts of said first switch; and a third wire having a first end coupled to a third brush from among said first plurality of brushes, the third brush from among said first plurality of brushes corresponding to a common, and said third wire having a second end coupled to a third electrically conductive contact from among said first plurality of electrically conductive contacts of said first switch.

14. The apparatus of claim 13, whereas the first primary power received from said primary power source corresponds to 110 volts and the second primary power received from said primary power source corresponds to 220 volts.

15. The apparatus of claim 13, said second cable further comprising:

a first wire having a first end coupled to a first brush from among said second plurality of brushes, and said first wire having a second end coupled to a first electrically conductive contact from among said second plurality of electrically conductive contacts of said first switch;

a second wire having a first end coupled to a second brush from among said second plurality of brushes, and said second wire having a second end coupled to a second electrically conductive contact from among said second plurality of electrically conductive contacts of said first switch; and a third wire having a first end coupled to a third brush from among said second plurality of brushes, and said third wire having a second end coupled to a third electrically conductive contact from among said second plurality of electrically conductive contacts of said first switch.

16. The apparatus of claim 15, whereas the first primary power of said primary power source is conveyed from said first brush of said first plurality of brushes to said pallet when said second switch connects said first switch with said secondary power source, said first wire of said first cable transmitting the first primary power from said first brush of said first plurality of brushes to said first contact of said first plurality of contacts of said first switch, said first wire of said second cable transmitting the first primary power from said first contact of said second plurality of contacts of said first switch to said first brush of said second plurality of brushes, and said first brush of said second plurality of brushes transmitting the first primary power to said pallet.

17. The apparatus of claim 15, whereas the second primary power of said primary power source is conveyed from said second brush of said first plurality of brushes to said pallet when said second switch connects said first switch with said secondary power source, said second wire of said first cable transmitting the second primary power from said second brush of said first plurality of brushes to said second contact of said first plurality of contacts of said first switch, said second wire of said second cable transmitting the second primary power from said second contact of said second plurality of contacts of said first switch to said second brush of said second plurality of brushes, and said second brush of said second plurality of brushes transmitting the second primary power to said pallet.

18. A method of supplying power to a pallet, comprising the steps of:

supplying power to a first plurality of electrically conductive terminals of a conveyor unit;

conveying a pallet not receiving power onto a second plurality of electrically conductive terminals of the conveyor unit when said second plurality of terminals are not receiving power;

said second plurality of terminals not receiving power when a first switch is not electrically connecting said first plurality of terminals with said second plurality of terminals;

when said pallet is positioned on said second plurality of terminals, activating a second switch with said pallet;

when said pallet activates said second switch, closing a circuit and activating said first switch to electrically connect said first plurality of terminals with said second plurality of terminals;

when said first plurality of terminals is electrically connected to said second plurality of terminals supplying power to said pallet; and stably and continuously providing power to said pallet when conveying said pallet from said second plurality of terminals to said first plurality of terminals.

19. The method of claim 18, wherein said first plurality of terminals correspond to a first plurality of conductive brushes and said second plurality of terminals correspond to a second plurality of conductive brushes.

20. The method of claim 19, wherein said pallet further comprises a copper terminal plate coupled to a side of said pallet, said copper terminal plate contacting said second plurality of conductive brushes.

21. The method of claim 18, said first switch being coupled to said first plurality of terminals via a first cable, said first switch being coupled to said second plurality of terminals via a second cable, said first cable being electrically connected to said second cable when said first switch is activated, said first switch being activated when power is supplied to said first switch from a power unit.

22. The method of claim 21, wherein said first switch further comprises:

a first plurality of electrically conductive contacts coupled to said first cable;

a second plurality of electrically conductive contacts coupled to said second cable; and an electromagnet connecting said first plurality of contacts with said second plurality of contacts when said second switch connects said power unit with said first switch, and disconnecting said first plurality of contacts from said second plurality of contacts when said second switch disconnects said power unit from said first switch.

23. The method of claim 21, wherein said first switch further comprises:

a first plurality of electrically conductive contacts coupled to said first cable;

a second plurality of electrically conductive contacts coupled to said second cable;

a plurality of elements connecting said first plurality of contacts with said second plurality of contacts when said second switch connects said power unit with said first switch, said plurality of elements disconnecting said first plurality of contacts from said second plurality of contacts when said second switch disconnects said power unit from said first switch.

24. A power supply apparatus supplying power to a pallet, comprising:

a conveyor unit conveying a pallet having a electrically conductive terminal plate, the pallet supporting a device;

a first plurality of electrically conductive brushes coupled to said conveyor unit, said first plurality of brushes receiving primary power from a primary power source;

a second plurality of electrically conductive brushes coupled to said conveyor unit, said first plurality of brushes being separately located from said second plurality of brushes;

a first switch coupled to said first and second pluralities of brushes, said first switch electrically connecting said first plurality of brushes with said second plurality of brushes to supply power to said second plurality of brushes when said first switch is activated, and said first switch electrically disconnecting said first plurality of brushes from said second plurality of brushes to not supply power to said second plurality of brushes when said first switch is deactivated;

a secondary power source electrically coupled to said first switch and selectively supplying secondary power to said first switch for operation of said first switch;

a second switch coupled to said first switch and said secondary power source, said second switch connecting said secondary power source with said first switch to activate said first switch, and said second switch disconnecting said secondary power source from said first switch to deactivate said first switch;

said pallet being positioned onto said second plurality of brushes when said second plurality of brushes is not receiving power;

said first switch activating after said conductive surface of said pallet contacts said second plurality of brushes; and said pallet stably and continously receiving power when being conveyed from said second plurality of brushes to said first plurality of brushes.

25. The apparatus of claim 24, wherein said second switch connects said secondary power source with said first switch when said electrically conductive terminal plate of said pallet conveyed by said conveyor unit contacts said second plurality of brushes.

26. The apparatus of claim 24, further comprising:

a first cable connecting said first plurality of brushes to said first switch and conveying primary power of said primary power source from said first plurality of brushes to said first switch; and a second cable connecting said second plurality of brushes to said first switch and conveying primary power of said primary power source from said first switch to said second plurality of brushes, the primary power of said primary power source being transferred from said second plurality of brushes to said pallet.

27. The apparatus of claim 26, wherein the primary power received by said pallet is transmitted via a third cable to said device supported by said pallet.

28. The apparatus of claim 26, wherein said first switch further comprises:

a first plurality of electrically conductive contacts coupled to said first cable;

a second plurality of electrically conductive contacts coupled to said second cable; and a switching system connecting said first plurality of contacts with said second plurality of contacts when said second switch connects said secondary power source with said first switch, and disconnecting said first plurality of contacts from said second plurality of contacts when said second switch disconnects said secondary power source from said first switch.

29. The apparatus of claim 28, said second cable further comprising:

a first wire having a first end coupled to a first brush from among said second plurality of brushes, and said first wire having a second end coupled to a first electrically conductive contact from among said second plurality of electrically conductive contacts of said first switch;

a second wire having a first end coupled to a second brush from among said second plurality of brushes, and said second wire having a second end coupled to a second electrically conductive contact from among said second plurality of electrically conductive contacts of said first switch; and a third wire having a first end coupled to a third brush from among said second plurality of brushes, and said third wire having a second end coupled to a third electrically conductive contact from among said second plurality of electrically conductive contacts of said first switch.

30. The apparatus of claim 28, said first cable further comprising:

a first wire having a first end coupled to a first brush from among said first plurality of brushes, the first brush from among said first plurality of brushes receiving a first primary power from said primary power source, and said first wire having a second end coupled to a first electrically conductive contact from among said first plurality of electrically conductive contacts of said first switch;

a second wire having a first end coupled to a second brush from among said first plurality of brushes, the second brush from among said first plurality of brushes receiving a second primary power from said primary power source, and said second wire having a second end coupled to a second electrically conductive contact from among said first plurality of electrically conductive contacts of said first switch; and a third wire having a first end coupled to a third brush from among said first plurality of brushes, the third brush from among said first plurality of brushes corresponding to a common, and said third wire having a second end coupled to a third electrically conductive contact from among said first plurality of electrically conductive contacts of said first switch.

31. The apparatus of claim 30, whereas the first primary power received from said primary power source corresponds to 110 volts and the second primary power received from said primary power source corresponds to 220 volts.

* * * * *